March 6, 1951 P. F. M. GLOESS ET AL 2,543,907

PULSE PERMUTATING ELECTRICAL CIRCUITS

Filed Nov. 1, 1949 2 Sheets-Sheet 1

INVENTORS
Paul Francois Marie Gloess
Louis Joseph Libois
By:
Haseltine, Lake & Co.
AGENTS INVENTORS
PAUL FRANCOIS MARIE GLOESS
LOUIS JOSEPH LIBOIS
By
Haseltine, Lake & Co.
AGENTS Patented Mar. 6, 1951 2,543,907

UNITED STATES PATENT OFFICE 2,543,907

PULSE PERMUTATING ELECTRICAL CIRCUITS

Paul François Marie Gloess and Louis Joseph Libois, Paris, France

Application November 1, 1949, Serial No. 124,773
In France November 13, 1948

5 Claims. (Cl. 177—380)

The invention concerns pulse permutating circuits for signals comprising series of pulses, particularly applicable in the case of transmissions by coded pulses.

It is characterized by circuits comprising delay lines associated with threshold electric or electronic elements and capable, for instance, in the case of transmissions by coded pulses, of effecting any desired transformation of a coded signal, according to any predetermined new law, corresponding to a different distribution law of the pulses in time.

An extension of the invention is characterized by the combination of an input delay line and several output delay lines, connected to the former ones, tap to tap, in a predetermined order, through threshold elements, said threshold elements, corresponding to each output delay line being triggered according to a mode of succession either predetermined or controlled, as the transmission proceeds, by auxiliary triggering signals for instance, the whole of the permutation circuits being capable of successively effecting, according to the mode of succession selected, transformations of the pulse signal, different from one instant to another, particularly for the purpose of ensuring the secrecy of communications.

The invention will now be described on examples of embodiment in connection with the use of code pulse modulation systems and we shall consider the transformations of a pulse train corresponding to one transmission channel at a given instant.

If, instead of a coded transmission, we are dealing with pulse multiplex systems of other types, in which a single pulse corresponds to each transmission channel, the pulse train considered can then correspond to the whole channel group of the system, during an analysis cycle, and the system according to the invention can then make it possible to effect any desired permutation of the channel pulses.

In the latter case, however, instead of having to operate only in an on or off manner, as in the case of a coded transmission, we must preserve, within given limits of fidelity, the pulse modulation characteristics of the system, by applying to the circuits of the invention the technique and dimensionings common in this matter.

The description will be made in connection with the appended drawings wherein.

Figure 1:
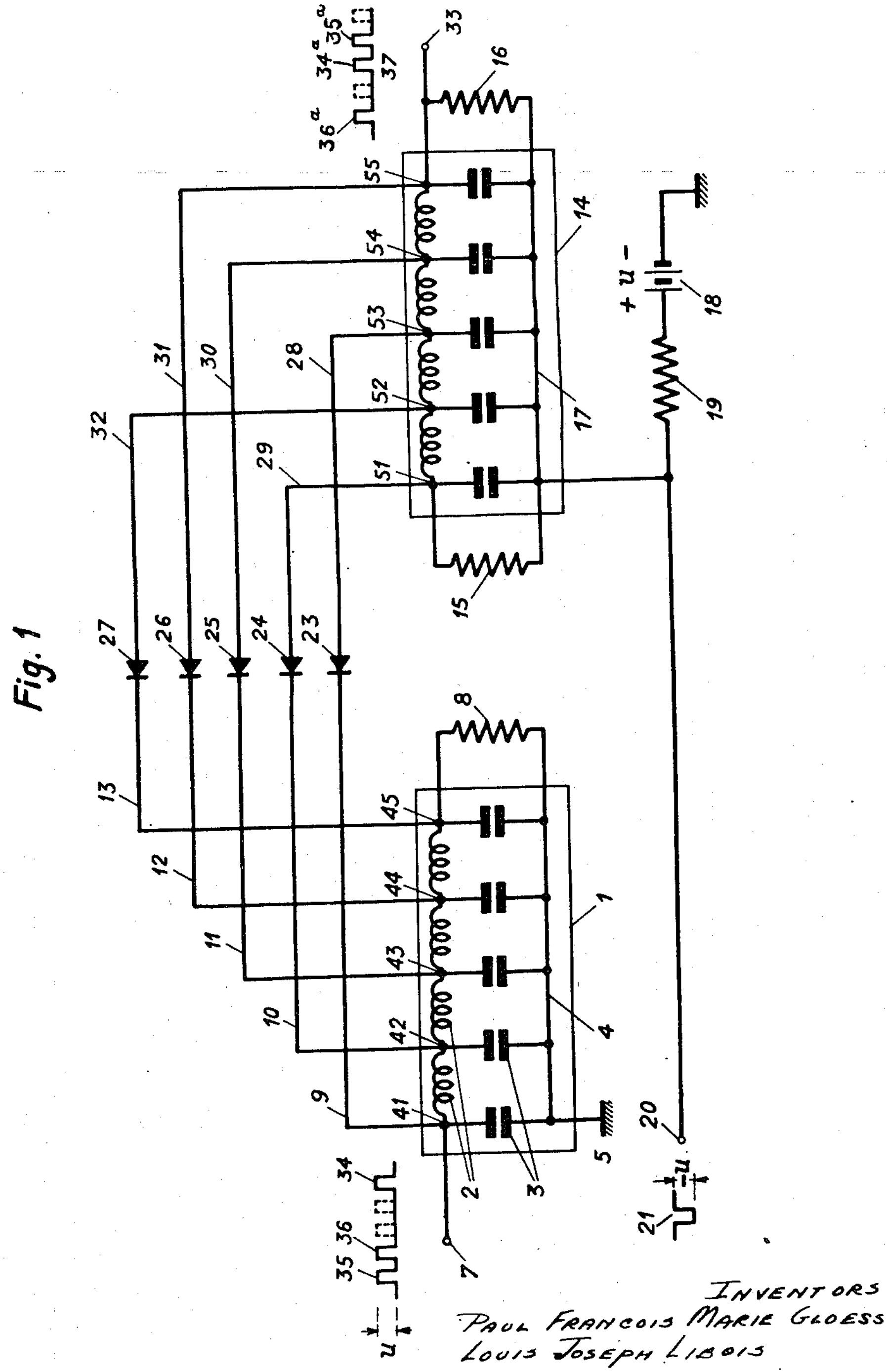
Figure 1 represents a circuit for the simple permutation of the elements of a code signal.

The arrangement of Figure 1 comprises a first delay line, shown schematically at 1. This line is made in any known manner and comprises, for instance, an assembly of inductance such as 2, assembled in series, and a plurality of shunt condensers such as 3, connected on one side to the junction points of the inductances 2 and, on the other side, to the ground connection 4. This connection is connected to the ground terminal 5 of the circuit while the pulse signal shown at 34—35—36 is applied at 7 to the input to the line.

A terminating resistance 8 matches the line at its other end, so as to avoid a reflection of the signals.

Taps 41 to 45 are provided along the line and correspond to output connections shown at 9, 10, 11, 12 and 13.

In the figure, there has been shown only one line section between two adjacent output connections, actually the necessity of a sharp differentiation of the outgoing signals requires each time the presence of several sections instead of one, for instance a minimum of three or four.

Further, the number of connections such as 9 to 13 must be equal to the number of elements of the pulse code, which is five in the example shown, as shown by the drawings of the signal 34—35—36, comprised here of three pulses and two spacings, or a total of five elements.

Further, the transmission time interval of the line 1 between two consecutive connections, such as 9 and 10 for instance, is taken equal to the unit time separating two elements of the signal 34—35—36.

A second line 14, preferably identical with line 1, but which may however offer a different characteristic impedance, is connected to the whole of the circuits as follows:

Two matching resistances 15 and 16 terminate the line at its two ends. The ground connection 17 is connected on one side to a source of positive bias 18 through a resistance 19 and, on the other side, to the terminal 20, to which is applied a negative control pulse 21.

Connections 28 to 32 are connected to taps along the line in the same manner as connections 9 to 13 of line 1. Each one of these connections 28 to 32 is connected through a dry rectifier (for instance a silicon or germanium detector of a known type), as represented at 23 to 27. These connections between the two lines are arranged so as to connect each tap of one of the lines to one tap of the other line, the number of possible combinations being equal to $\underline{N}=1\times2\times3\times\ldots\times N$ for the case of a code with N elements, or 120 combinations in the present case.

An output terminal 33 is also connected to one of the ends of the line 14.

The operation of the device is as follows:

If one considers the instant when the last pulse 34 of the signal 34—35—36 is applied to the input 7 of line 1, and therefore also to the connection 9, the pulse 35 will appear at the same instant on the connection 13 and the pulse 36 on the connection 12, owing to the correspondence between the transmission times of the four sections of line 1, connecting the connections 9 to 13, with the intervals between the elements of signal 34—35—36. The connections 10 and 11, on the other hand, correspond to the passing of two spacings of the signal 34—35—36.

Neglecting the transmission losses of the line 1, a voltage $+u$, corresponding to the peak voltage of the pulses 34, 35 and 36 will then appear at that instant on the connections 9, 12 and 13, the connections 10 and 11 remaining at a zero potential.

Whatever happens for these various connections, the biassing voltage $+u$, supplied by the source 18 to the line 14 generally counterbalances the voltages appearing along the line 1, and none of the rectifiers such as 27 would become conducting in the absence of the action of the action of the auxiliary or control signal 21.

This signal, with a negative polarity, and whose voltage reaches, for example, also the value $u$, is precisely applied at 20 at the instant previously considered, i. e. it coincides in time with the signal 34 or, in its absence, with the corresponding code element.

Its effect will be to neutralize, at least partly, the biassing voltage produced by 18 and thus to remove the action of permanent locking transmitted to the rectifiers such as 27 which will then pass the voltage pulses present at that instant on the connections 9, 12 and 13, corresponding in the case considered to the signal shown at 34—35—36, these connections being here connected respectively to the connections 28, 31 and 32 of the line 14, each one of them comprising in series a dry rectifier such as 27.

The transformed signal 37 will be obtained at 33 at the output from the line 14, and will comprise the pulses $34^a$, $35^a$ and $36^a$ corresponding respectively to the pulses 34, 35 and 36 of the primitive signal, variously distributed in time.

The displacement of the connections 28 to 32, according to the various possible combinations, will determine each time a new arrangement of the signal 37, corresponding to a new law for the distribution of the code, in the case of a signal by coded pulses.

It is obvious that pulse shaping circuits will have to be added, in general, to the described circuit, to restore well defined characteristics to the outgoing pulses, according to the known technique.

The releasing pulse 21 may be derived from a suitable point of pulse generating or regenerating circuits, pertaining according to the case considered, for example, to the modulation, demodulation or transmission circuits of the system considered, and may eventually be delayed and/or changed in shape.

Figure 2:
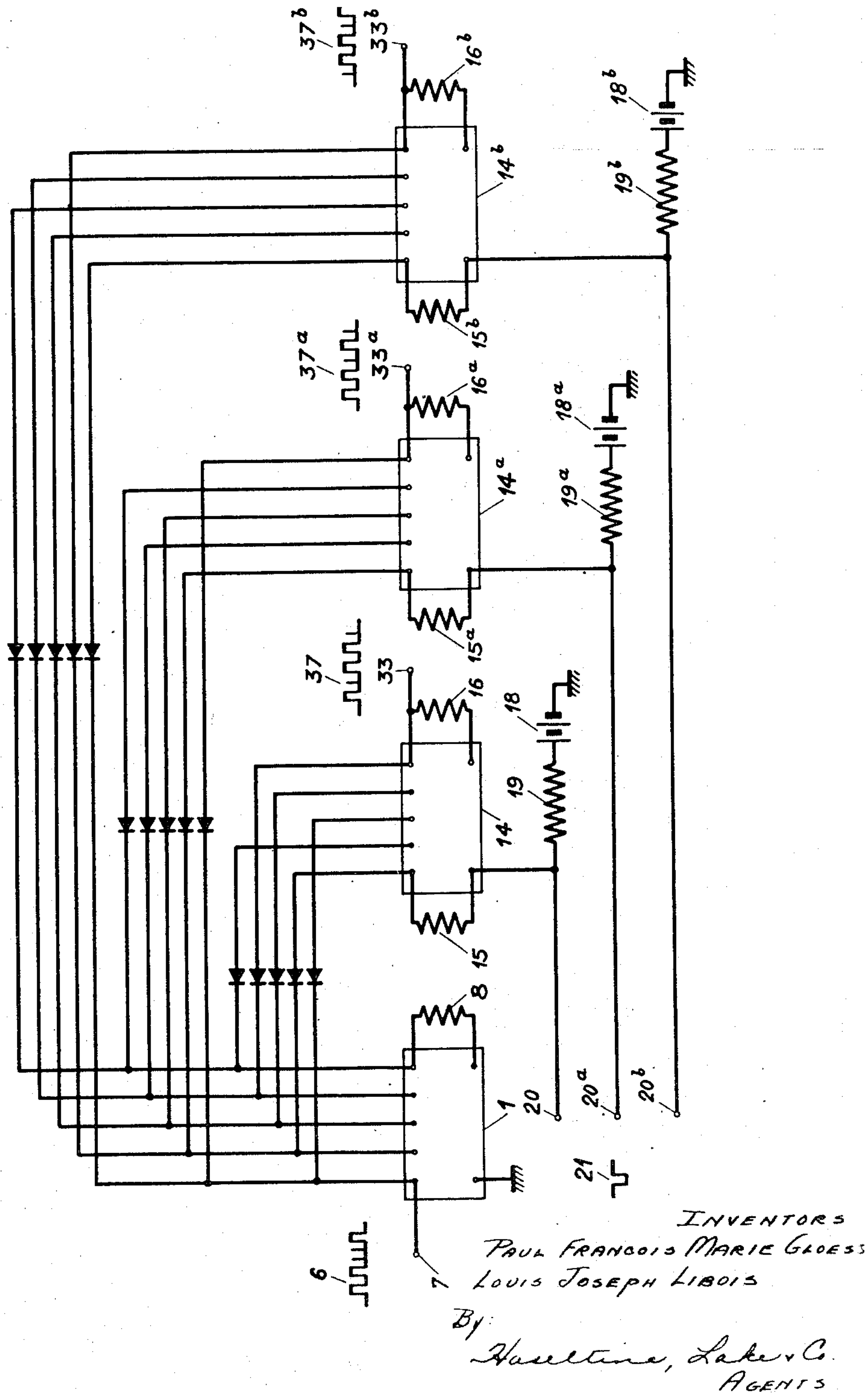
Figure 2 shows a permutation circuit, variable from one instant to the next, for the elements of a code signal, acting as a secrecy device.

Figure 2 is a schematic diagram of a more complex circuit making it possible at any time to transform the pulse signal according to any one of three predetermined combinations, corresponding to the three secondary lines 14, $14^a$, $14^b$, according to whether the pulse 21 is applied at 20, $20^a$, $20^b$, the number of three combinations being taken by way of example and not limitative in any way.

The transformed signals appear each time at one of the points 33, $33^a$ or $33^b$, which it is sufficient to couple in a single output, by means, for instance, of three electronic mixer tubes, not shown.

It will be seen on Figure 2, that three assemblies of connecting circuits go from the line 1 to the three lines 14, $14^a$ and $14^b$. The combinations shown in the case of the figure give, from the signal 34—35—36 applied, the resulting signals shown respectively at 37, $37^a$ and $37^b$.

We claim:

1. In an electrical transmission system wherein signals are transmitted by successive groups of pulses staggered in time at regular intervals each group being constituted by a plurality of pulses and having a constant duration, a device for permutating pulses in each one of said groups according to a predetermined law, comprising two delay lines each having a delay time at least equal to said constant duration, taps along the length of said delay lines in number equal to that of pulses in one group, resistances for terminating both ends of each of said delay lines so as to avoid reflection of signals at said ends, two-terminal unidirectionally conducting elements in number equal to that of pulses in one group and each connected by one of its terminals to one tap of one of said delay lines and by the other of its terminals to one tap of the other delay line, means for biassing said two-terminal unidirectionally conducting elements so as to render them normally non-conducting, a pulse generator producing recurrent control pulses with a period equal to the time interval between two successive group of pulses, means for applying said control pulses to all said unidirectionally conducting elements so as to render them conducting at recurrent time intervals, means for impressing abovesaid signals constituted by groups of pulses upon one end of one of said delay lines, and means for receiving modified signals at one end of the other delay line and impressing said modified signals upon a working circuit.

2. A device as in claim 1, wherein the unidirectionally conducting elements are dry rectifiers.

3. A device as in claim 1, wherein the unidirectionally conducting elements are electronic diodes.

4. A device as in claim 1, wherein the taps along the length of each delay line are located at points separated by lengths corresponding to equal delay time intervals.

5. In an electrical transmission system wherein signals are transmitted by successive groups of pulses staggered in time at regular intervals, each group being constituted by a plurality of pulses and having a constant duration, a device for permutating pulses in each one of said groups according to one of a plurality of predetermined laws selected at will, said device comprising a primary delay line and a plurality of secondary delay lines in number equal to that of above-said predetermined laws each having a delay time at least equal to said constant duration, taps along the length of each of said delay lines in number equal to that of pulses in one group and resistances for terminating both ends of said delay lines so as to avoid reflection of signals at said ends, two-terminal unidirectionally conducting elements in number equal to that of pulses in one group multiplied by that of said secondary delay lines and each connected by one of its terminals to one tap of said primary delay line and by the other of its terminals to one tap of one of said secondary delay lines, means for biassing said two-terminal unidirectionally conducting elements so as to render them normally non-conducting, a pulse generator producing recurrent control pulses with a period equal to the time interval between two successive groups of pulses, means for applying said control pulses to all unidirectionally conducting elements connected to one selected at will of said secondary delay lines so as to render them conducting at recurrent time intervals, means for impressing above-said signals constituted by groups of pulses upon one end of above-said primary delay-line, and means for receiving modified signals at one end of said selected at will secondary delay line and impressing said modified signals upon a working circuit.

PAUL FRANÇOIS MARIE GLOESS.
LOUIS JOSEPH LIBOIS.

No references cited.